(12) United States Patent
Kwak et al.

(10) Patent No.: US 7,919,424 B2
(45) Date of Patent: Apr. 5, 2011

(54) PLATINUM BASED CATALYST FOR OXIDATION/REDUCTION REACTION AND ITS USE

(75) Inventors: Byong Sung Kwak, Daejeon (KR); Young Seek Yoon, Daejeon (KR); Jin Hong Kim, Daejeon (KR); Mee Sook Lim, Daejeon (KR)

(73) Assignee: SK Energy Co., Ltd., Seoul (KR)

( * ) Notice: Subject to any disclaimer, the term of this patent is extended or adjusted under 35 U.S.C. 154(b) by 55 days.

(21) Appl. No.: 12/512,676

(22) Filed: Jul. 30, 2009

(65) Prior Publication Data

US 2010/0004120 A1 Jan. 7, 2010

Related U.S. Application Data

(62) Division of application No. 12/158,279, filed as application No. PCT/KR2006/005100 on Nov. 29, 2006, now abandoned.

(30) Foreign Application Priority Data

Dec. 23, 2005 (KR) .......... 10-2005-0128780

(51) Int. Cl.
*B01J 31/00* (2006.01)
*B01J 23/40* (2006.01)
*B01J 23/10* (2006.01)

(52) U.S. Cl. ........ 502/151; 502/172; 502/304; 502/325; 502/332; 502/333; 502/334; 502/339

(58) Field of Classification Search ............... 502/151, 502/172, 304, 325, 332, 333, 334, 339
See application file for complete search history.

(56) References Cited

U.S. PATENT DOCUMENTS

| | | | |
|---|---|---|---|
| 6,436,363 B1 * | 8/2002 | Hwang et al. .......... 423/651 |
| 6,723,298 B1 | 4/2004 | Baumann et al. | |
| 6,777,117 B1 * | 8/2004 | Igarashi et al. .......... 429/412 |
| 6,846,475 B1 | 1/2005 | Taguchi et al. | |
| 6,932,848 B2 | 8/2005 | Dardas et al. | |
| 2002/0061277 A1 | 5/2002 | Ruettinger et al. | |
| 2003/0235526 A1 | 12/2003 | Vanderspurt et al. | |
| 2004/0187384 A1 | 9/2004 | Dardas et al. | |
| 2004/0266616 A1 | 12/2004 | Teshigawara et al. | |
| 2007/0112209 A1 * | 5/2007 | Le-Khac .......... 549/533 |

FOREIGN PATENT DOCUMENTS

| | | |
|---|---|---|
| JP | 08150322 | 6/1996 |
| JP | 2000-178007 | 6/2000 |
| JP | 2004-000949 | 1/2004 |
| JP | 16121960 | 4/2004 |
| JP | 2004-284912 | 10/2004 |
| KR | 2004-0063130 | 9/2004 |
| WO | WO-03/039742 | 5/2003 |

OTHER PUBLICATIONS

Panagiotopoulou et al., "Effect of morphological characteristics of TiO2-supported noble metal catalysts on their activity for the water-gas shift reaction," Journal of Catalysis, 225, pp. 327-336 (2004).
Choung et al., "Pt-Re bimetallic supported ono CeO2-ZrO2 mixed oxides as water-gas shift catalysts," Catalysis Today, 99, pp. 257-262 (2005).
Catalyst Handbook 2nd Edition, "The Water-gas Shift Reaction," pp. 282-289 (1996).

* cited by examiner

*Primary Examiner* — Elizabeth D Wood
(74) *Attorney, Agent, or Firm* — McDermott Will & Emery LLP

(57) ABSTRACT

Disclosed herein are a platinum-based catalyst for oxidation/reduction reactions and the use thereof. The platinum-based catalyst is prepared by loading a catalyst composition comprising a water soluble salt of at least one metal selected from among cerium (Ce), zirconium (Zr) and rhenium (Re), on a support comprising at least one selected from among alumina, silica and titania. The disclosed catalyst can be prepared in a simple manner without any particular limitation as to the kind of usable water soluble platinum salt, and when it is applied to various oxidation reactions, including water gas shift reactions of carbon monoxide, three-way catalytic reactions, and selective oxidation reactions of carbon monoxide, and to reduction reactions, such as reactions of removing nitrogen oxide (NOx), it will show excellent catalytic activity. In particular, the disclosed catalyst shows excellent performance even in a specific temperature range in which it is difficult to apply the prior high-temperature water gas shift reaction catalyst and low-temperature water gas shift reaction catalyst. Also, it can remove carbon monoxide even at high temperatures without the loss of hydrogen caused by methanataion, and thus is particularly useful in a hydrogen production process of producing high-purity hydrogen for fuel cells.

9 Claims, 1 Drawing Sheet

PLATINUM BASED CATALYST FOR OXIDATION/REDUCTION REACTION AND ITS USE

CROSS REFERENCE TO PRIOR APPLICATIONS

This application is a divisional of U.S. patent application Ser. No. 12/158,279, filed Jun. 19, 2008, now abandoned, which application is the U.S. national phase of International Application No. PCT/KR2006/005100, filed Nov. 29, 2006, which claims priority from Korean Patent Application No. 10-2005-0128780, filed Dec. 23, 2005, each of which are hereby incorporated by reference in their entireties.

TECHNICAL FIELD

The present invention relates to a platinum-based catalyst for oxidation/reduction reactions and the use thereof. More particularly, the present invention relates to a platinum-based catalyst for oxidation/reduction reactions, which is prepared by impregnating a support with a catalyst composition comprising a water-soluble salt of at least one metal selected from among cerium, zirconium and rhenium, a water-soluble platinum salt, alkylene oxide, and water, and drying and calcining the impregnated catalyst composition, and can show excellent catalytic activity when it is applied in oxidation/reduction reactions, and to the use thereof.

BACKGROUND ART

A water gas shift reaction is an important reaction step in many chemical processes. Particularly, when fossil fuels such as hydrocarbons or alcohols are reformed to produce hydrogen for use as fuel in fuel cells, which have recently been of great interest, carbon monoxide contained in reformate gas can be converted into carbon dioxide in the presence of water vapor, so that the amount of carbon monoxide acting to reduce the performance of an electrode catalyst in fuel cells (particularly, polymer electrolyte fuel cells), as shown in the following reaction equation, can be reduced and, at the same time, the production of hydrogen can be increased:

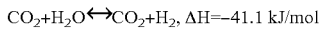

$$CO_2 + H_2O \leftrightarrow CO_2 + H_2, \Delta H = -41.1 \text{ kJ/mol}$$

The water gas shift reaction is widely used in large-scale processes requiring a large amount of hydrogen, for example, the petrochemical industry, and catalysts thereof are well known. The reaction is a mild exothermic reaction and needs to be carried out at a low temperature in order to reduce the amount of carbon monoxide to a given concentration or less. Generally, two kinds of water gas shift reactors are used in commercialized processes.

The water gas shift reactions include a high-temperature water gas shift reaction, which is carried out at a high temperature of 350-450° C., and a low-temperature water gas shift reaction, which is carried out at a temperature of 190-260° C. [Catalyst Handbook $2^{nd}$ Edition].

An iron-chromium oxide catalyst, which is used in the high-temperature water gas shift reaction, has an advantage in that it is easy to elevate the temperature of a catalyst bed during operation, but this catalyst shows low activity at 300° C. (generally, 350° C.) or below. A copper-zinc-alumina catalyst, which is used in the low-temperature water gas shift reaction, can treat carbon monoxide to a very low concentration at a temperature of 190-260° C. according to thermodynamic equilibrium, but is readily inactivated at a temperature higher than 250° C. and tends to be spontaneously oxidized upon exposure to oxygen, thus requiring special care in the replacement thereof. For this reason, the demand has arisen for a water gas shift reaction catalyst that can be used in a temperature ranging from 250° C. to 350° C., shows high activity, and does not show a severe decrease in the activity thereof, even upon exposure to oxygen.

In connection with this demand, Japanese Patent Laid-Open Publication No. 2004-000949, U.S. Pat. No. 6,846,475 and Japanese Patent Laid-Open Publication No. 2004-284912, for example, disclose platinum noble metal catalysts satisfying this demand. More recently, it has been reported that a catalyst, containing platinum as a main component and an active cocatalyst loaded on a support such as ceria, zirconia or titania, is particularly advantageous for the water gas shift reaction [Journal of catalysis 225 (2005) 327-336, Catalysis Today 99 (2005) 257]. Although it is well known that titania, ceria and zirconia are excellent as catalyst supports for platinum-based catalysts for the water gas shift reaction, these metal oxides are expensive, and it is very difficult to impart these metal oxides with high specific surface area, pore volume and mechanical strength, which are suitable for catalyst supports. Thus, in order to prepare a metal oxide support having such excellent properties, enormous expense is incurred.

Japanese Patent Laid-Open Publication No. 2000-178007, Korean Patent Laid-Open Publication No. 2004-0063130, and U.S. Pat. No. 6,723,298, for example, disclose methods of preparing catalysts in a more economic and commercially useful manner by adding cerium or zirconium to a metal oxide support such as alumina, which has large specific surface area, good pore development and high mechanical strength and, at the same time, is inexpensive.

However, these prior technologies either strictly limit a platinum precursor in order to increase the effect of adding cerium and the like [Korean Patent Laid-Open Publication No. 2004-0063130], or use a complex preparation process. Specifically, in order for platinum to be loaded on ceria more than on alumina, an excess amount of cerium is first loaded on a support such as alumina and then dried and calcined to form a layer of ceria (cerium oxide) on the surface of the alumina support. Thereafter, an aqueous platinum solution is additionally loaded on the ceria-containing alumina support and dried and calcined, thus preparing a catalyst [U.S. Pat. No. 6,723,298 and US Patent Publication No. 2002/0061277A1].

The reason why the limited precursor and the multi-step process are inevitably used in the prior art is that when a platinum precursor such as chloroplatinic acid ($H_2PtCl_6 \cdot xH_2O$), which is strongly acidic and contains halogen, is used, the acidic precursor will be preferentially adsorbed on the base site of alumina and finally distributed mainly on the surface of alumina, so that the effect of addition of cerium on an activity promotion will be insignificant. In addition, it is known that halogen such as chlorine is attributable to a decrease in catalyst activity. To sufficiently obtain the effect of the addition of cerium for these two reasons, it is common to either excessively increase the content of platinum in order to increase the amount of platinum that is adjacent to cerium, or to use a platinum precursor not containing halogen such as chlorine [Korean Patent Laid-Open Publication No. 2004-0063130 and U.S. Pat. No. 6,846,475].

Meanwhile, oxygen storage materials, which have been used in the prior art, include ceria, zirconia, and ceria composites. A three-way catalyst for the purification of exhaust gas shows excellent conversion of carbon monoxide (CO), hydrocarbon, nitrogen oxide (NOx) and the like at a very narrow fuel-to-air ratio range of around about 14.6, but shows a significantly reduced conversion at an air-to-fuel ratio deviating from said range. Cerium has a very excellent ability of storing oxygen in the fuel lean zone and releasing oxygen in the fuel rich zone, because it is readily converted into Ce(III) and Ce(IV).

Thus, cerium has been adopted and used since the beginning of the 1990s, because it plays an important role in reducing the problem of a great decrease in conversion caused by a small change in the air-to-fuel ratio, when it is used together with the three-way catalyst. However, it is difficult to avoid exposing the three-way catalyst for the purification of exhaust gas to high temperatures, and in this case, ceria used in the three-way catalyst has a problem in that the fusion of micropores or the sintering of crystals occurs, resulting in a rapid decrease in the specific surface area thereof, a rapid increase in the crystal size thereof, and a decrease in the oxygen storage capability and oxygen mobility thereof. That is, ceria has a problem of low heat resistance.

DISCLOSURE

Technical Problem

It is an object of the present invention to provide a platinum-based catalyst prepared from an impregnating and coating solution, which can sufficiently achieve the effect of addition of cerium and the like and has stability regardless of the kind of platinum precursor, including a platinum precursor containing halogen. Thus, the present invention aims to suggest a platinum-based catalyst, which is prepared in a simple and convenient process, has improved performance and, at the same time, is applicable in a wide range of fields in which oxidation/reduction reactions are carried out.

Technical Solution

According to one aspect of the present invention, there is provided a platinum-based catalyst for oxidation/reduction reactions, which is prepared by impregnating a catalyst composition comprising (i) a water-soluble salt of at least one metal selected from among cerium (Ce), zirconium (Zr) and rhenium (Re), (ii) a water-soluble platinum salt, (iii) a C2-C10 alkylene oxide and (iv) water, on a support comprising at least one selected from alumina, silica and titania, and drying and calcining the loaded catalyst composition.

The water-soluble salt of the metal is preferably cerium nitrate.

Also, the water-soluble platinum salt may be a compound which contains or does not contain a halogen atom. According to one embodiment of the present invention, the water-soluble platinum salt is chloroplatinic acid ($H_2PtCl_6$).

Meanwhile, the alkylene oxide may be propylene oxide or butylene oxide.

The catalyst composition preferably comprises the alkylene oxide in an amount corresponding to 0.5-10 times the sum of values obtained by multiplying the number of moles of cationic species present in the catalyst composition by the oxidation number of the cationic species.

Meanwhile, the platinum-based catalyst preferably comprises 1-20 wt % of the metal, 0.1-10 wt % of platinum and 70-98 wt % of the support.

The support of the catalyst may be (i) powder, (ii) a sphere, (iii) an extrudate in the form of a granule, or (iv) a palletized material. According to one embodiment of the present invention, the support of the catalyst can be prepared by being coated on a monolith substrate selected from among the group consisting of metal foam, ceramic foam and a honeycomb, a metal plate or a metal fabric.

According to another aspect of the present invention, there is a provided a method of using said platinum-based catalyst in an oxidation or reduction reaction selected from the group consisting of a water gas shift reaction of carbon monoxide, three-way catalytic reaction, a selective oxidation reaction of carbon monoxide and a reaction of removing nitric oxides.

ADVANTAGEOUS EFFECTS

A cerium-containing platinum-based catalyst according to the present invention has no specific limitation with respect to the use of a platinum precursor, and is prepared through a simple process, so that it shows high activity when it is applied in various oxidation/reduction reactions, such as water gas shift reactions.

The support of the catalyst according to the present invention has no limitation on the shape thereof, and may be a various material such as powder, a spherical shape, an extrudate in the form of a granule, or a pelletized material. Alternatively, the support can be formed by coating a support component on a monolith substrate such as a metal foam, a ceramic foam or a honeycomb, a metal plate or a metal fabric. Also, the inventive catalyst can be prepared by grinding the catalyst metal into fine powder, making a slurry containing the catalyst metal and then coating the slurry directly on said monolith substrate, metal plate or metal fabric.

Although the catalyst of the present invention, when applied in a water gas shift reaction, shows particularly effective performance in a temperature range of 250-350° C. in which it is difficult to apply prior commercial catalysts, the application field thereof is not limited only to the water gas shift reaction, and the inventive catalyst can be applied in various fields, in which an increase in platinum catalyst activity caused by the oxygen storage capability of cerium (or ceria) has been reported, including three-way catalysts reactions, selective oxidation reaction of carbon monoxide, and reactions for removing nitrogen oxide (NOx). Thus, the inventive catalyst has high industrial value.

BEST MODE

Figure 1:
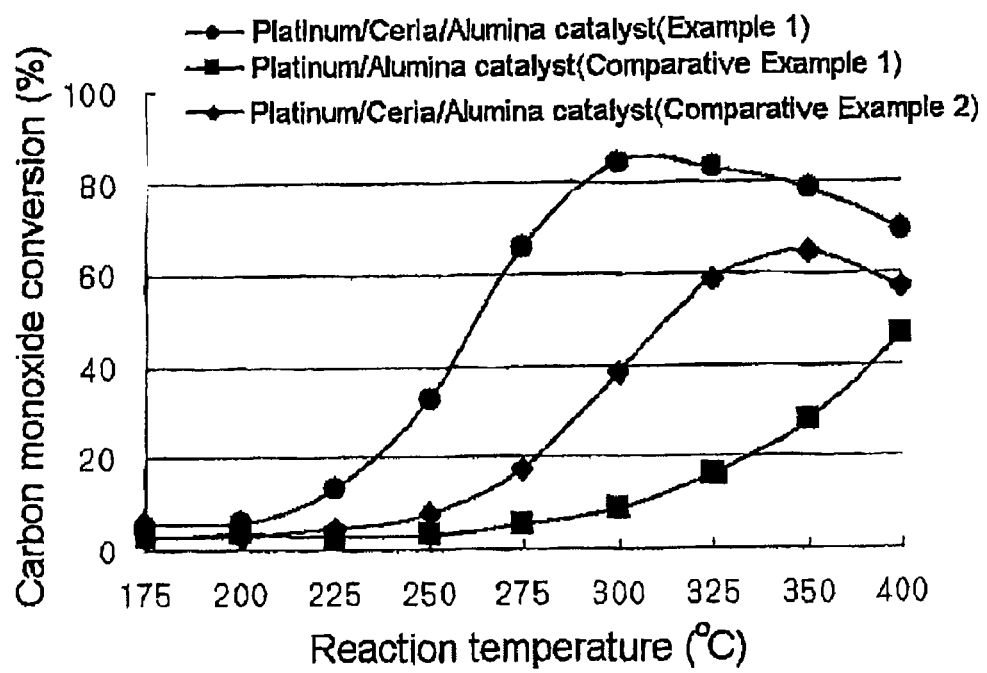
FIG. 1 is a graphic diagram showing a change in the activity of a water gas shift reaction, as a result of changing the method of adding cerium to a platinum catalyst prepared using chloroplatinic acid as a precursor.

Hereinafter, the present invention will be described in further detail.

As described above, the present invention provides a platinum-based catalyst for oxidation/reduction reactions, including water gas shift reactions, which has increased catalyst activity due to the use of cerium, maintains high activity regardless of the kind of a platinum precursor, and is prepared through a simple, convenient and economical process. The platinum-based catalyst of the present invention is not limited only to application to water gas shift reactions, and can be applied in various fields, in which an increase in platinum catalyst activity attributable to the oxygen storage capability of cerium has been reported, including three-way catalysts reactions, selective oxidation reactions of carbon monoxide, and reactions for removing nitrogen oxide (NOx). Thus, the inventive catalyst has high industrial value.

A support, which is used in the present invention, may comprise either a single metal oxide, for example, alumina, silica or titania, or a composite oxide containing, as a main component, at least one selected from among these metal oxides. The support is preferably used in an amount of 70-98 wt % based on the weight of the platinum-based catalyst.

As the support, one having high pore volume is preferable, and particularly suitable for use in reactions having high space velocity. The pore volume of the support is more than 0.2 cc/g, and preferably more than 0.4 cc/g. Although the support can be, for example, a sphere, a monolith, an extrudate, or a pelletized material, it is preferably a molded material having a large number of macropores about 0.1-100 µm in size.

Also, the support is not limited only to the form of these supports and can be prepared in the form of, for example, granules, or can be formed by coating a support component on a monolith substrate such as a metal foam, a metal mesh, a ceramic foam or a honeycomb, a metal plate substrate or a metal fabric.

Meanwhile, the inventive catalyst may be prepared by finely grinding a powdery or granular catalyst metal, adding deionized water, an organic solvent or the like to the fine powder to make a slurry, and then coating the slurry on a monolith substrate such as a metal foam, a metal mesh, a ceramic foam or a honeycomb, a metal plate substrate or a metal fabric.

The catalyst of the present invention is loaded with at least platinum as an active ingredient, but the method of loading the metal such as platinum is not limited in the present invention. Examples of the method of loading the metal may include: an incipient wetness impregnation method, comprising preparing an aqueous solution of a metal catalyst precursor at a given concentration according to the absorption capability of a support and causing the aqueous solution to be absorbed into the pores of the support; a vacuum evaporation method comprising immersing a support in an aqueous solution of a metal catalyst precursor dissolved in an excess amount of deionized water and then drying the precursor-containing solution slowly at a temperature of about 60-80° C. in a vacuum; and a spray method of spraying an aqueous solution of a metal catalyst precursor on a support.

One of the most important characteristics of the present invention is that there is no particular limitation on usable platinum precursors.

Specifically, according to the present invention, it is possible to use, as the platinum precursor (i.e., the water-soluble platinum salt), compounds containing a halogen atom, for example, chloroplatinic acid ($H_2PtCl_6$), or compounds not containing a halogen atom, for example, platinum nitrate and amines such as dinitrotetramine ($Pt(NH_3)_4(NO_3)_2$). Particularly, the present invention has the greatest advantage in that a chloroplatinic acid containing a halogen atom can be used without limitation.

The low-temperature activity of the inventive catalyst tends to increase with an increase in the loaded amount of the water-soluble platinum salt. For example, the content of platinum in the resulting catalyst, subjected to drying and calcination, may be 0.1-10 wt %. Generally, the content of platinum may be 0.5-5 wt %. If the loading amount of the platinum is too low, the effect of the platinum will not be sufficiently exhibited, and if the loading amount is too high, on the other hand, a clear increase in performance resulting from the increase in the loading amount will not be shown.

Also, the platinum-based catalyst according to the present invention preferably contains, in addition to platinum, either at least one metal selected from among cerium (Ce), zirconium (Zr) and rhenium (Re), or an oxide thereof, in order to increase the activity of the catalyst.

Examples of the metal precursor, i.e., the water-soluble metal salt, may include nitrates, preferably cerium nitrate ($Ce(NO_3)_3 \cdot 6H_2O$), and the loading amount of the metal can be 1-20 wt % based on the weight of the platinum-based catalyst, but is preferably 3-15 wt % in terms of economic efficiency.

With regard to the sequence of loading of the above-described water-soluble platinum salt and other water-soluble platinum salts, a method of sequentially loading the salts, and a method of loading platinum and cerium at the same time, may all be used without particular limitation, but it is preferable to load the metal salts at the same time.

According to the present invention, in order to enable a catalyst having high activity to be obtained regardless of the kind of water-soluble platinum salt, a C2-C10 alkylene oxide and the above-described water-soluble platinum salt and water-soluble metal salt are added to water and mixed with each other to obtain a catalyst composition. Preferably, said alkylene oxide is propylene oxide or butylene oxide.

In this regard, the stoichiometrically required amount (moles) of the alkylene oxide is equal to a sum of values obtained by multiplying the number of moles of each of the cationic species present in the catalyst composition by the oxidation number of the cationic species. However, when an excess amount of the alkylene oxide is used, it can exhibit a sufficient effect in a short time. The amount of alkylene oxide used is preferably 0.5-10 times the above-described stoichiometric required amount, and more preferably 1-5 times the stoichiometric required amount.

The alkylene oxide has the effect of either gradually increasing the pH of the aqueous solution to metal hydroxides such as platinum hydroxide and cerium hydroxide or dehydrating these hydroxides to form a colloidal phase having a bond of platinum-oxygen-cerium (or zirconium or rhenium). Thus, after the catalyst composition is loaded on an alumina support and subjected to drying and calcining processes, platinum can bind more strongly to ceria than to the alumina carrier to maximize catalyst activity caused by the addition of cerium or the like. In addition, when propylene oxide, for example, is used as the alkylene oxide, it has a positive effect of reducing the amount of halogen remaining in the resulting catalyst by forming by-products such as 1-chloro-2-propanol ($CH_3CH(OH)CH_2Cl$) and then being volatilized in a subsequent process of preparing the catalyst.

The catalyst composition is impregnated on the support according to the known conventional method as described above, and then dried and calcined, affording the inventive catalyst. After loading, the catalyst composition may preferably be dried at about 110° C. and then calcined at 350-500° C., but the present invention is not specifically limited thereto.

The catalyst thus obtained may be used as it is, but may also be used after the platinum is activated into a reduced metal. The reduction reaction may be performed using either a wet reduction method, which uses a reducing agent such as hydrazine, or a gas-phase reduction method, which uses hydrogen gas.

The above-described platinum-based catalyst of the present invention can be effectively applied in, for example, water gas shift reactions of carbon monoxide, three-way catalytic reactions, oxidation reactions such as selective oxidation reaction of carbon monoxide, and reduction reactions such as a reaction of removing nitrogen oxide.

Also, the inventive platinum-based catalyst can be prepared in a simple manner without any limitation on the kind of usable water-soluble platinum salt, and when it is applied in various oxidation/reduction reactions, including water gas shift reactions of carbon monoxide, three-way catalytic reactions, reactions for removing nitrogen oxide (NOx), and selective oxidation reactions of carbon monoxide, it will show excellent catalytic activity. It is particularly useful in a water gas shift reaction, which can be used to effectively remove carbon monoxide from reformed gas comprising hydrogen as a main component and containing carbon monoxide and water, after a reforming reaction of hydrocarbon.

Specifically, the inventive catalyst shows particularly good performance in a water gas shift reaction in a temperature range of 250-350° C., in which it is difficult to apply the prior high-temperature water gas shift reaction catalyst and low-temperature water gas shift reaction catalyst. Also, it can remove carbon monoxide even at high temperatures without the loss of hydrogen caused by methanation, and thus is particularly useful in a hydrogen production process of producing high-purity hydrogen for fuel cells.

MODE FOR INVENTION

Hereinafter, the present invention will be described in further detail with reference to examples, but the scope of the present invention is not limited to these examples.

Example 1

$5.7 \times 10^{-4}$ mol of chloroplatinic acid and $6.27 \times 10^{-3}$ mol of cerium nitrate were completely dissolved in 80 cc of deionized water. Propylene oxide was added to the solution, followed by stirring for at least two hours. Herein, the molar ratio between cerium oxide and propylene oxide was set to 1:10. The formed yellowish colloidal phase solution was impregnated on a catalyst support. As the catalyst support, alpha-alumina (specific surface area: 100 m$^2$/g, and pore volume: 0.49 cc/g) was used, and was loaded using a vacuum evaporation method. The catalyst loading solution was maintained at 65-70° C. for 2 hours to remove excess water. The prepared catalyst was dried at 110° C. for 12 hours to completely remove water present in the pores, and calcined at 350° C. for 3 hours. The propylene oxide was completely volatilized during the drying and calcining processes and did not remain in the resulting catalyst. The weight ratio of platinum, cerium and alumina was 1:8:91.

The shift reaction activity of the prepared catalyst was tested. For the test of the catalyst activity, a mixed gas of 10% carbon monoxide, 12% carbon dioxide and 78% hydrogen was diluted with nitrogen at a volume ratio of 1:1 and used as reaction gas. The amount of additionally fed water was set to 25% of total reaction gas, and the molar ratio between carbon monoxide and water was set to 6.6. After the catalyst was subjected to a reduction reaction using a mixture gas of hydrogen and nitrogen at a 1:3 ratio at 400° C. for 4 hours, a catalyst activity test was performed using the reduced catalyst under the following conditions: a gas-hourly space velocity of 5000/hr, a reaction pressure of 1 atm, and a reaction temperature of 200-400° C. The test results are shown in FIG. 1.

Example 2

$5.7 \times 10^4$ mol of platinum dinitrotetramine and $6.27 \times 10^{-3}$ mol of cerium nitrate were completely dissolved in 80 cc of deionized water. Then, catalyst impregnation, drying and calcining were carried out under the same conditions as in Example 1, thus preparing a catalyst. The weight ratio between platinum, cerium and alumina in the prepared catalyst was 1:8:91.

Figure 2:
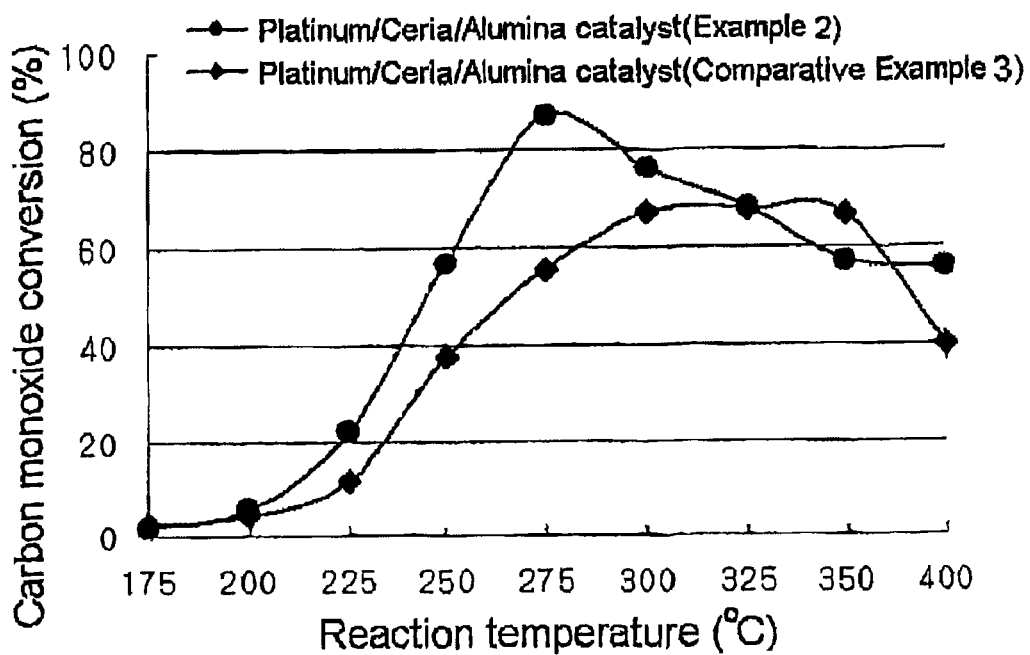
FIG. 2 is a graphic diagram showing a change in the activity of a water gas shift reaction, as a result of changing the method of adding cerium to a platinum catalyst prepared using platinum dinitrotetramine as a precursor.

The activity of the prepared catalyst was tested in the same manner as in Example 1, and the test results are shown in FIG. 2.

Comparative Example 1

$5.18 \times 10^4$ mol of chloroplatinic acid was completely dissolved in 80 cc of deionized water to prepare an aqueous platinum solution. The prepared aqueous solution was impregnated on an alumina support, and catalyst loading, drying and calcining processes were carried out under the same conditions as in Example 1, thus preparing a platinum catalyst having a weight ratio of platinum:alumina of 1:99.

The activity of the prepared catalyst was tested in the same manner as in Example 1, and the assessment results are shown in FIG. 1.

Comparative Example 2

$6.2 \times 10^{-3}$ mol of cerium nitrate was completely dissolved in 80 cc of deionized water and then impregnated on an alumina support using a vacuum evaporation method. The cerium-loaded alumina was dried at 110° C. for 12 hours so as to completely remove water. Then, the dried alumina was calcined in an electric furnace in an air atmosphere at 400° C. for 4 hours to convert the impregnated cerium to ceria (cerium oxide).

The ceria-alumina composite support thus prepared was impregnated with platinum.

$5.18 \times 10^{-4}$ mol of chloroplatinic acid was completely dissolved in 80 cc of deionized water to prepare an aqueous platinum solution. The catalyst loading, drying and calcining processes were carried out under the same conditions as in Example 1. The weight ratio between platinum, cerium and alumina in the resulting catalyst was 1:8:91.

The activity of the prepared catalyst was tested in the same manner as in Example 1, and the assessment results are shown in FIG. 1.

Comparative Example 3

A platinum catalyst having a weight ratio of platinum:cerium:alumina of 1:8:91 was prepared in the same manner as in Comparative Example 2 using the ceria-alumina composite support prepared in Example 2 and platinum dinitrotetramine as a platinum precursor.

The activity of the prepared catalyst was tested in the same manner as in Example 1, and the test results are shown in FIG. 2.

Carbon monoxide conversion, shown in FIGS. 1 and 2 is defined as follows:

Carbon monoxide conversion(%)=(1−moles of carbon monoxide at reactor outlet/moles of carbon monoxide introduced into reactor)×100

Methane selectivity is defined as follows:

Methane selectivity(%)=(moles of produced methane/moles of reacted methane)×100

The results of activity test of the catalysts prepared in Examples and Comparative Examples above are shown in FIGS. 1 and 2. As shown in FIGS. 1 and 2, the catalysts containing cerium all showed a great increase in catalytic activity compared to the catalyst of Comparative Example 1, impregnated only with platinum. However, the catalysts prepared in Comparative Examples 2 and 3 similar to the prior methods (U.S. Pat. No. 6,723,298, US Patent Publication No. 2002/0061277A1 and U.S. Pat. No. 6,846,475) showed activity greatly different from those of the catalysts prepared in Examples 1 and 2. The catalyst prepared in Example 1 showed an activity significantly higher than that of the catalyst prepared in Comparative Example 2, similar to the prior art, even though chloroplatinic acid ($H_2PtCl_6 \cdot xH_2O$) was used as the platinum precursor. Thus, it can be seen that the problem occurring in the prior art of using chloroplatinic acid as a platinum precursor was mitigated by adding propylene oxide without requiring a separate complex operation, and the present invention was clearly distinguishable from the prior art in that a catalyst having excellent performance compared to that of the improved prior art (U.S. Pat. No. 6,723,298, US Patent Publication No. 2002/0061277A1, U.S. Pat. No. 6,846,475 and Korean Patent Laid-Open Publication No. 2004-0063130) could be prepared in a simple manner. In Example 1, the chloroplatinic acid as the platinum precursor could be substituted with platinum nitrodiamine ($Pt(NH_3)_2(NO_2)_2$), platinum tetramine hydroxide ($Pt(NH_3)_4(OH_2)$), platinum dinitrotetramine ($Pt(NH_3)_4(NO_3)_2$) or the like, but in this case, the effect of increasing catalyst activity was not greater than in the case of using chloroplatinic acid as the platinum precursor.

In the case of the catalyst prepared in Example 2, a cerium content of 1-20 wt % in the resulting catalyst showed an increase in catalytic activity, but the content of cerium showing the optimal catalytic activity was 3-15 wt %. In the case where the content of cerium was more than 20 wt %, a decrease in catalytic activity was observed instead, and this was because the excess amount of cerium formed a thick ceria (cerium oxide) layer within the catalyst pores during the catalyst preparation process, thus deteriorating the pore structure. Korean Patent Laid-Open Publication No. 2004-0063130 briefly mentioned a method similar to Example 2, but it did not suggest specific examples, but it limited the platinum precursor to platinum dinitrodiamine ($Pt(NH_3)_4(NO_2)_2$) and platinum dihydroxytetramine ($Pt(NH_3)_4(OH_2)$), and thus was definitely different from Example 2, which used platinum dinitrotetramine ($Pt(NH_3)_4(NO_3)_2$) as the platinum precursor.

Because the catalysts prepared in Examples 1 and 2 showed very low methanation, they were also advantageous in terms of the efficient use of hydrogen. As a typical example, the platinum-based catalyst according to Example 1 did not show the production of methane up to 350° C. in the performance test conditions of Example 1, and showed a very low methane selectivity of about 12% even at a reaction temperature of 400° C.

As described above, the present invention has an advantage in that a platinum-based catalyst having a very good performance compared to that of the catalysts suggested in the prior art is prepared through a simple preparation process regardless of the kind of platinum precursor used. Such a catalyst can be used after coating it on a molded material such as one having a powdery or a spherical shape, a granule, an extrudate, or a pelletized material, a monolith substrate such as a metal foam, a ceramic foam or a honeycomb, a metal plate or a metal fabric, and can be used mainly in water gas shift reactions. However, this catalyst is not limited only to applications in water gas shift reactions, and can be used in various fields, in which an increase in platinum catalyst activity caused by the oxygen storage capability of cerium has been reported, including three-way catalysts reactions, selective oxidation reactions of carbon monoxide, and reactions for removing nitrogen oxide (NOx).

Although the present invention has been described in detail with reference to specific embodiments, those skilled in the art will appreciate that these embodiments are for illustrative purposes only, that the platinum-based catalyst for oxidation/reduction reactions according to the present invention is not limited thereto, and that the modification or improvement thereof is possible within the technical concept of the present invention.

Simple changes and modifications to the present invention all fall within the scope of the present invention, and the specific range of the present invention is to be defined by the accompanying claims.

The invention claimed is:

1. A method of preparing a platinum-based catalyst for oxidation/reduction reactions, which comprises the steps of:
   (A) impregnating a catalyst composition comprising (i) a water-soluble salt of at least one metal selected from among cerium (Ce), zirconium (Zr) and rhenium (Re), (ii) a water-soluble platinum salt, and (iii) a C2-C10 alkylene oxide and (iv) water, on a support comprising at least one selected from alumina, silica and titania, (B) drying the resultant impregnated catalyst composition, and (C) calcining the impregnated catalyst composition, wherein the catalyst composition comprises the alkylene oxide in an amount corresponding to 0.5-10 times a sum of values obtained by multiplying the number of moles of each cationic species present in the catalyst composition by the oxidation number of the cationic species.

2. The method of claim 1, wherein the water-soluble salt of the metal may be cerium nitrate.

3. The method of claim 1, wherein the water-soluble platinum salt is a compound which contains or does not contain a halogen atom.

4. The method of claim 1, wherein the water-soluble platinum salt is chloroplatinic acid ($H_2PtCl_6$).

5. The method of claim 1, wherein the alkylene oxide may be propylene oxide or butylenes oxide.

6. The method of claim 1, wherein the platinum-based catalyst comprises 1-20 wt % of the metal, 0.1.1-10 wt % of platinum and 70-98 wt % of the support.

7. The method of claim 1, wherein the support for the catalyst is (i) powder, (ii) a sphere, (iii) a extrudate in the form of a granule, or (iv) a pelletized material.

8. The method of claim 1, wherein the support for the catalyst can be coated on a monolith substrate selected from a group consisting of a metal foam, a ceramic foam and a honeycomb, a metal plate or a metal fabric.

9. The method of claim 1, wherein the catalyst is prepared by grinding the catalyst, making a slurry using the ground catalyst, and coating the slurry on a monolith substrate selected from a group consisting of a metal foam, a ceramic foam and a honeycomb, a metal plate or a metal fabric.

* * * * *